US 6,463,457 B1

(12) United States Patent
Armentrout et al.

(10) Patent No.: US 6,463,457 B1
(45) Date of Patent: Oct. 8, 2002

(54) SYSTEM AND METHOD FOR THE ESTABLISHMENT AND THE UTILIZATION OF NETWORKED IDLE COMPUTATIONAL PROCESSING POWER

(75) Inventors: Steven L. Armentrout, Reston; James O'Connor, Oakton; James Gannon, Fairfax; Brian Sletten, Arlington; Sean Cier; Sarah Carlson, both of Fairfax; Antony Davies, Oakton, all of VA (US); Jonathan Davis, Washington, DC (US); Greg DuPertuis, Manassas, VA (US); Scott McLoughlin, Washington, DC (US)

(73) Assignee: Parabon Computation, Inc.

( * ) Notice: Subject to any disclaimer, the term of this patent is extended or adjusted under 35 U.S.C. 154(b) by 0 days.

(21) Appl. No.: 09/648,986

(22) Filed: Aug. 28, 2000

Related U.S. Application Data

(60) Provisional application No. 60/150,766, filed on Aug. 26, 1999, and provisional application No. 60/210,344, filed on Jun. 13, 2000.

(51) Int. Cl.[7] .............................................. G06F 13/00
(52) U.S. Cl. ........................................ 709/201; 710/268
(58) Field of Search .................................. 709/201, 202, 709/206, 102; 710/268, 260

(56) References Cited

U.S. PATENT DOCUMENTS

| 6,009,452 | * | 12/1999 | Horvitz ....................... 709/102 |
| 6,098,091 | * | 8/2000 | Kisor .......................... 709/202 |
| 6,112,225 | | 8/2000 | Kraft et al. .................. 709/202 |
| 6,112,243 | * | 8/2000 | Downs et al. ............... 709/226 |
| 6,192,388 | * | 2/2001 | Cajolet ........................ 709/100 |
| 6,249,836 | * | 6/2001 | Downs et al. ............... 710/268 |

* cited by examiner

*Primary Examiner*—David Wiley
(74) *Attorney, Agent, or Firm*—Roberts Abokhair & Mardula, LLC

(57) ABSTRACT

A distributed computing platform using the idle computational processing power of a plurality of provider computers is disclosed. At least one networked server collects tasks from client computers, schedules and distributes the tasks to networked provider computers, and collects and returns results to client computers. A client API forms tasks and collects results. A compute engine operates on the provider computers to communicate with the server and execute tasks using idle computational power.

50 Claims, 8 Drawing Sheets

SYSTEM AND METHOD FOR THE ESTABLISHMENT AND THE UTILIZATION OF NETWORKED IDLE COMPUTATIONAL PROCESSING POWER

RELATED APPLICATIONS

This application claims the benefit of U.S. Provisional Application No. 60/150,766, filed Aug. 26, 1999 and U.S. Provisional Application No. 60/210,344, filed Jun. 13, 2000.

FIELD OF THE INVENTION

This invention relates generally to computer use over a network to form a distributed computing platform. More specifically the present invention is a system and method for use of idle time of computers that are connected to a network by users requiring significant computing power without the need for a large scale dedicated processing unit.

BACKGROUND OF THE INVENTION

When a computer is operating, but not actively performing computations for someone, it is said to be idle. Because of their incredible speed, modem computers are idle most of the time, not only when they are running screen savers, but even when they are being used. For instance, a fast typist working at top speed in a word processor uses only a fraction of the available computational capacity of a desktop PC. Although the time between a typist's keystrokes seems immeasurably small to humans, it is an eternity when measured in computer time —an eternity filled with unproductive idle computation. Because of this gross underutilization, it is estimated that well over 95% of the world's computational capacity presently goes to waste.

SUMMARY OF THE INVENTION

The present invention is drawn to organization and use of the idle processing power of general-purpose computers to form a distributed computing platform.

It is therefore an objective of the present invention to provide large amounts of computational power to users without the users having to purchase a large computer for such purposes.

It is a further objective of the present invention to harness the idle computational power of many computers and make that power available to clients on an as needed basis.

It is yet another objective of the present invention to allow those who provide computers to be used to have complete access to their computers whenever desired without interruption of personal use.

It is still another objective of the present invention to provide computational power without regard to any specific schedule of computer non-use.

It is yet another objective of the present invention to allow clients who require computational power to specify the characteristics of the power they require.

It is still another objective of the present invention to charge clients that need computational power based upon the power and other characteristics specified by the client.

It is a further objective of the present invention to permit the client to specify the reliability of the computational power required by the client It is yet another objective of the present invention to allow a provider of a computer to be used in the present invention to specify the amount of RAM and disk space the provider wished to devote to use by others.

It is still another objective of the present invention to push content of various types to providers during the time that providers are supplying excess computational power to tasks of the present invention.

It is yet another objective of the present invention to provide security to both the client and the provider during the running of tasks on providers.

It is still another objective of the present invention to insure that a client cannot access the computational resources of the provider beyond that which is required to run the clients tasks.

It is a further objective of the present invention to permit clients to specify checkpoints in the running of client tasks so that interrupted tasks can be resumed without significant the loss of work.

It is still another objective of the present invention to charge clients for the use of computational power in a flexible way based upon the amount of power to be used and the reliability of the power to be used.

It is yet another objective of the present invention to allow clients to create a virtual cluster of machines of client-definable computational power to run client tasks.

It is thus an overall goal of the present invention to utilize this heretofore underutilized computer power in a novel way as a distributed computing platform to meet the needs of users who require vast computing power but who may not have the financial wherewithal to purchase or lease large mainframe computers or other supercomputing solutions.

Just as email service providers deliver email from one user to another, a business running the system and method of the present invention will disseminate the tasks of a client's distributed computer program to multiple providers for remote execution. As the remote providers complete tasks, the providers will deliver results back to the originating client. As part of the present invention, an intermediary server delivers computation from providers to clients.

The Internet infrastructure to facilitate the distributed processing of the present invention requires three components:

1) Client software applications for requesting and submitting distributed processing requests and jobs. This is accomplished through a client API that allows client jobs to be coded as independent tasks. The underlying task model, while complex, is hidden from the user;

2) Provider software called a compute engine (CE) for managing the launch and execution of tasks delivered from the intermediary server. The CE runs unobtrusively and securely on the provider's computer. It processes tasks when the computer is idle and returns results to the server when the provider computer connects to the network which, for example, and without limitation may be the Internet; and 3) A centralized task server for exchanging tasks and results between participants. The centralized task server (CTS) comprises a three-tiered architecture as more fully set forth below and is redundant, fault tolerant and scalable as traffic and clients increase. A task scheduler in the CTS matches power requested to available provider computer resources.

For purposes of this application, the client is the individual or organization that is requesting the data processing services of the present invention. The provider constitutes the plurality of individuals or organizations having excess processor capacity that are offering that capacity to the system of the present invention to process requests from clients.

The flow of the present invention is as follows:

1. Using the client software from their desktop, clients launch their distributed programs, the tasks of which are transported to the centralized task server.
2. Client tasks are pooled at the centralized task server and allocated to provider computers based on a scheduling algorithm that takes into account the characteristics of the provider computer (e.g., processor speed, disk space, amount of RAM, communication speed, percentage of time the provider computer is on-line; percentage of time the provider computer is in use). The CE on the provider computer periodically contacts the server of the present invention to retrieve task assignments or other control messages. Such contact occurs periodically and opportunistically (whenever a network connection is present, for example, when a provider computer has dialed into the Internet) and not just when idle computational power is detected. The invention also allows for an auto-dial capability where the provider computer can specify intervals when the CE can connect to the server. Multiple tasks can be assigned to a CE at a given time. This is done to increase the probability that the CE will always have tasks to execute.
3. When a provider computer's CE detects that its host computer is idle, it executes tasks that were retrieved from the centralized task server.
4. The results of completed tasks are saved locally. When a connection to the centralized task server exists, statuses of current tasks, and results of previously executed tasks are sent to the centralized server of the present invention.
5. Results are pooled by the centralized task server until the originating client can connect to the server and retrieve them. Note that a special case of this is the case when the client is connected as the job is running. In this case, the client sees the results in "real time". In this fashion, from a client's perspective, the present invention represents a gigantic virtual computer or distributed computing platform, ideally suited for performing large-scale parallel distributed computation, a function that was formerly the exclusive domain of traditional "chips-and-solder" supercomputers. The present invention, however, will perform such computations at a fraction of the cost and on an as-needed basis.

The business model associated with the present invention is to create a new market for idle computation power. A business running the apparatus and method of the present invention will purchase the idle computational power of millions of providers (individual computer owners), and deliver that idle computational power as a single entity to clients (technologists seeking ultra-high-performance computation).

Presently, idle computation has no value whatsoever because the market for computation is inseparable from the market for computers. Users have no means of buying, for example, larger amounts of times on disparate computers to execute a job when the user needs it and not just when a specific computer is available.

With the present invention, however, immense value can be created by a computational intermediary in the same way that financial engineers create value by constructing derivative financial instruments. In effect, the present invention strips excess computational capacity from provider computers, bundles it into quantities suitable for large-scale parallel computations, and delivers it to clients on an as needed basis. Providers benefit by selling a heretofore-wasted resource. Clients benefit because they can inexpensively purchase just the quantity of computation needed, thereby avoiding the normally huge fixed costs associated with purchasing a supercomputer.

The business model of the present invention creates and intermediates the new market in idle computation.

Finally, an applications research and development group will add value by utilizing its superior knowledge of distributed processing to solve high-payoff computational problems. Such a team will spur demand in two ways: First, its purchases of idle computation will stimulate market activity; second, the success of applications and research group will demonstrate to prospective clients the power and cost-effectiveness of idle time processing.

DETAILED DESCRIPTION OF THE INVENTION

The present invention is a system and method for allowing those people who own personal computers or larger computers, (hereinafter "providers") to offer unused and excess computational power on their "provider computers" to people who have need for large computational power for their computing tasks. These people are known as "clients."

Figure 1:
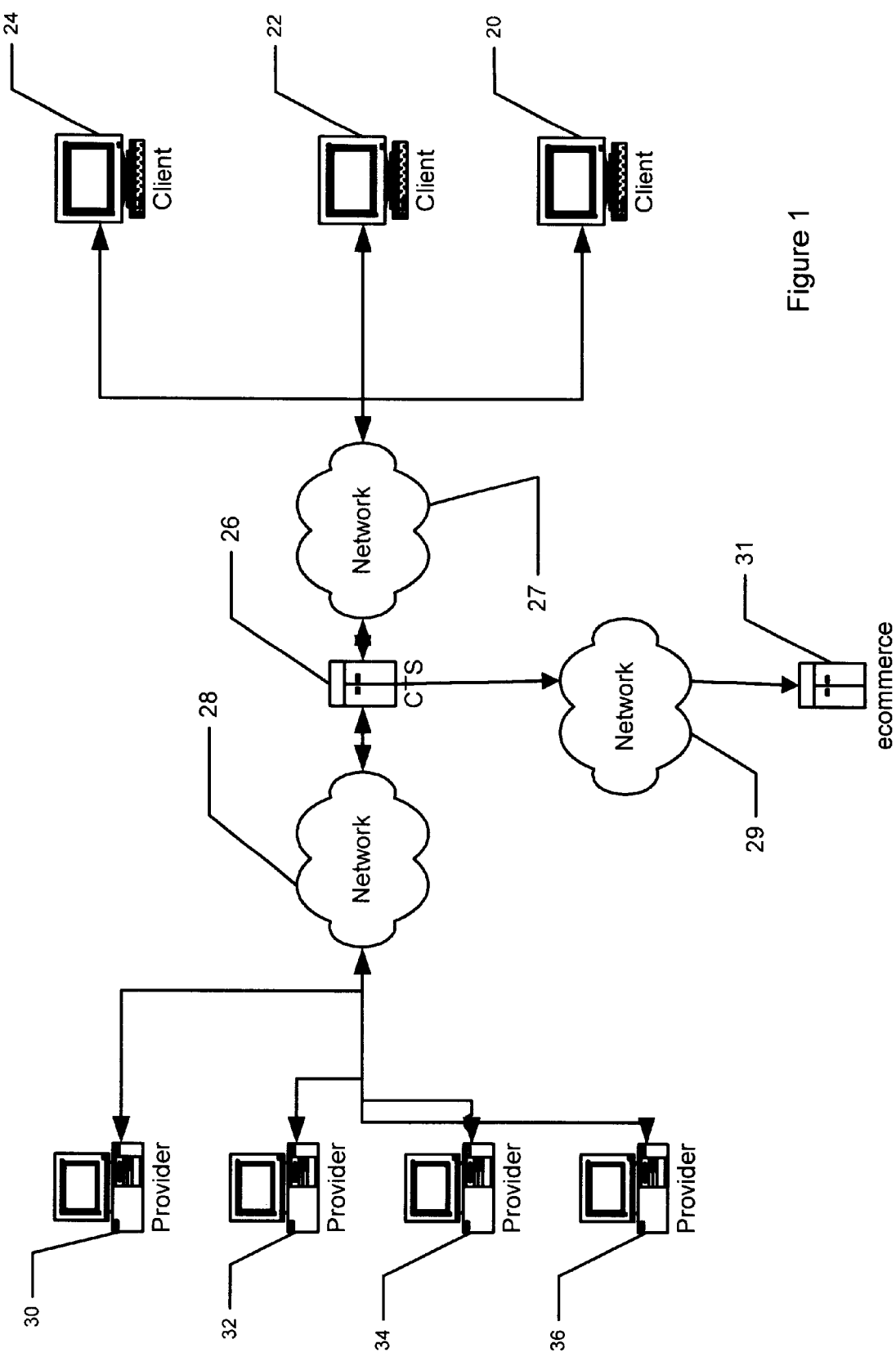
FIG. 1 illustrates an architecture of one embodiment of the present invention

Referring now to FIG. 1, the architecture of the present invention is illustrated. The present invention basically comprises three major components: a client application that has been developed within a client development environment; a centralized task server (CTS) 26; and a compute engine (CE).

In the context of this description a client application is an application program, developed within the client development environment that is part of this invention, which solves a problem utilizing the system that constitutes this invention. The typical problem such an application solves is an extremely computation intensive problem that is amenable to decomposition into a large number of independent tasks (this is not intended as a limitation). The client development environment consists of a runtime API which defines how tasks interact with their environment, a client API which allows a client application to manage the execution of jobs consisting of a very large number of tasks, and a set of tools that support the monitoring and control of very large jobs.

A centralized task server (CTS) 26 intermediates the needs of client applications and the power of the provider computers 30–36 to meet the needs of clients for computational power. Clients make requests via client computers 20–24 and by virtue of a client application programming interface (Client API) that allows the client to specify the amount of computing power desired, the individual rating of computers that will execute the client's job (e.g., 2 gigaflops or GF [Flops =Floating point operations per second]), how much memory and disk space will be necessary and other parameters essential to running the client's job. The CTS receives tasks from clients and assigns them to one or more providers based the characteristics of the available providers and the job characteristics specified by the client. When providers return results, the CTS forwards these back to the client application.

Each provider computer has a resident compute engine (CE) that receives and executes the various tasks that are assigned to it by the CTS. The CE runs client tasks and manages the use of idle computation power of the provider computer. The CE returns intermediate and final results to the CTS that then forwards them back to the client application.

Communication between the client application, CTS, and CE is governed by a communication protocol unique to the present invention. At a high level of abstraction, separate message and data channels exist. The message channel is a bi-directional channel between clients and the server that is used to pass high-level messages that facilitate distributed processing. The data channel is a channel used to pass large blocks of data called data elements and executable elements. Executable elements are blocks code developed by clients or a third-party. This code represents tasks or portions of tasks. Data elements are blocks of data that are either input to or output of client tasks. High-level messages transmitted on the message channel contain references to data and executable elements. These items are separately transferred on the data channel on an as needed basis.

The details of the client development environment, CTS, CE, and protocol the protocol that these components use to communicate will be covered in subsequent sections.

Figure 2:
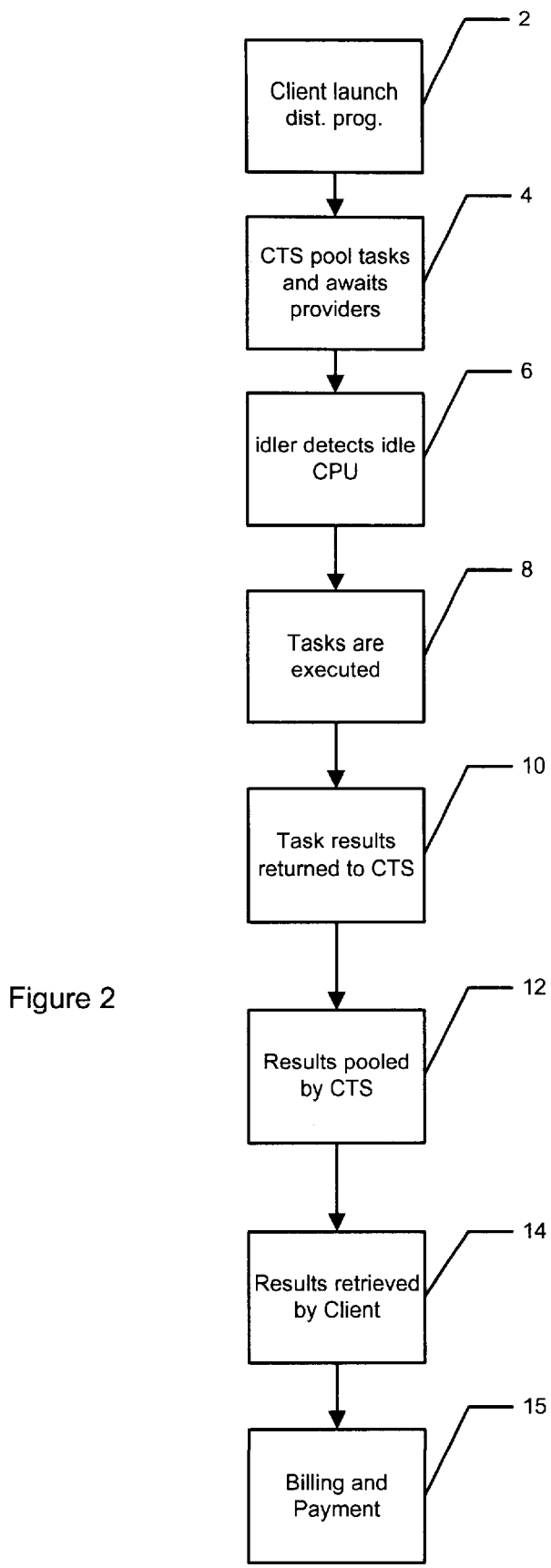
FIG. 2 illustrates a flow of work over one embodiment of the present invention.

Referring first to FIG. 2 the general flow of the present invention is illustrated. Clients 10, that is, those entities desiring execution of computationally intensive tasks, launch client software that submits jobs consisting of multiple tasks. Although only one box is shown, it is anticipated that there will be many clients that have such computationally intensive jobs on or about the same time. Thus more than one client will be requesting such services.

The centralized task server (CTS) takes all incoming tasks and pools them in some priority order. The CTS validates each task (checks that all required executable and data elements are in place) and assigns it to one or more CEs, based on information on available provider computers and their characteristics. The software of the CTS will be able to size the available computational power to the tasks that are pooled thus assigning the tasks the appropriate amount of available computational power.

Periodically, and depending on when a network connection is present, the CE contacts the CTS to see if there are any messages for it. These messages could be task assignments or other control messages. The CE then retrieves tasks from the CTS so that, to the degree possible, the tasks are readily available for execution whenever idle computing power is available. When a CE receives a task assignment from the CTS, it downloads the data and executable elements required to run that task. The task is then put in the "prepared" state. Each CE constantly monitors its processor state and when the processor is idle it launches the "next" prepared task. The task selected to run is a function of the arrival time of the task, the task state, and the task priority. If a task is received that has a higher priority than the currently running task, the current task is preempted (halted and results saved) and the new task is executed.

Once tasks are executed, task results are returned 10 to the CTS. The CTS journals all work done by provider computer CE's on behalf of clients. This journal is then used as the basis for adjustments to client and provider computer accounts on a periodic basis using known accounting methods. These accounts are the basis for client billing and provider payment.

As mentioned above, clients develop applications using the client development environment that is part of this invention. The client development environment consists of a runtime API which defines how tasks interact with their environment, a client API which allows a client application to manage the execution of jobs consisting of a very large number of tasks, and a set of tools that support the monitoring and control of very large jobs. These are described in more detail below.

The runtime API defines the environment in which client task run. The runtime API consists of a set of function calls that the client task will exercise during execution to interact with its environment. This API contains calls that the task can use to:

Obtain access to the initialization parameters for the task.

Obtain access to data elements needed to perform its function.

Perform a checkpoint so that if the task is interrupted, it can restart at the checkpoint and therefore reduce the loss of work.

Send interim and final results back to the server.

In addition, the API defines entry points that allow the environment to control the task. These include:

Start a task (note that restarting a task is a special case of starting a task).

Stop (suspend) a task.

Request a checkpoint.

Request a status.

Terminate a task.

This is not an exhaustive list of functions and is only illustrative of what can be accomplished via the runtime API.

There can be multiple implementations of this API which allow the task to run in multiple environments. The two most important implementations for the purpose of this invention are the implementation in the CE and the run local implementation included in the client development environment. The CE implementation allows the task to run in the CE on a provider's box (regardless of platform). The run local implementation allows clients to execute tasks on their local client machine. This enables debugging and testing before the job is distributed. However, the client could elect to run an entire job (or a certain number or percent of tasks) locally.

The client API is used to develop an application to control the execution of a job running on the present invention. The client API broadly supports job definition, job launch, job monitoring, and job control.

Job definition involves the creation of the job, setting job properties (e.g., requested power, deadline, maximum cost, scheduling hints), creating its data/executable elements and its tasks, and associating data/executable elements with tasks. The client has the option of providing certain limits to the job being submitted. For example, a client can limit the job to a certain dollar expenditure or amount power applied.

Job launch involves launching the tasks that constitute a job.

Job monitoring involves the selective monitoring of a job. The data available included both status and statistics. The client API allows the client to attach to a job or a specific task and monitor all or a subset of the results being returned by the job or task. Tasks can return interim and final results via the runtime API. Certain default patterns are set by the system concerning when interim results are to be obtained although the client can change these parameters as well as explicitly request results for executing jobs.

Job control functions include starting, removing, stopping, and resuming jobs and tasks.

The client API of the invention supports jobs of arbitrary size. A "fire and forget" event model allows clients to launch jobs much larger than the client machine would otherwise be capable of tracking simultaneously. This is accomplished by programmatically ensuring that clients monitor only task results, not the tasks themselves. This approach serializes the receipt of task results such that a limited size computer can "drive" an arbitrarily large job.

The invention also includes general-purpose tools, developed using the Client API, for monitoring jobs. Jobs can be monitored whether they run locally (at the client's node) or remotely (on a provider computer node). The client display is updated periodically (the periodicity is configurable). The display for the client is designed to keep the client fully informed at all times regarding the job submitted. As such it includes dollars spent, number of tasks running, number of completed tasks, number of task that are executing, the number of task delivered to the CTS, the total work accomplished, the amount of work done per task (percentage), the work done on completed tasks, and the time spent per completed task. These statistics are illustrative only. Other statistics may also be gathered as desired by the client. The information that is monitored is displayed in both graphic and text form.

These tools can also be used to support other general-purpose functions such as starting and stopping individual tasks or jobs, removing individual tasks or jobs, etc.

Figure 3:
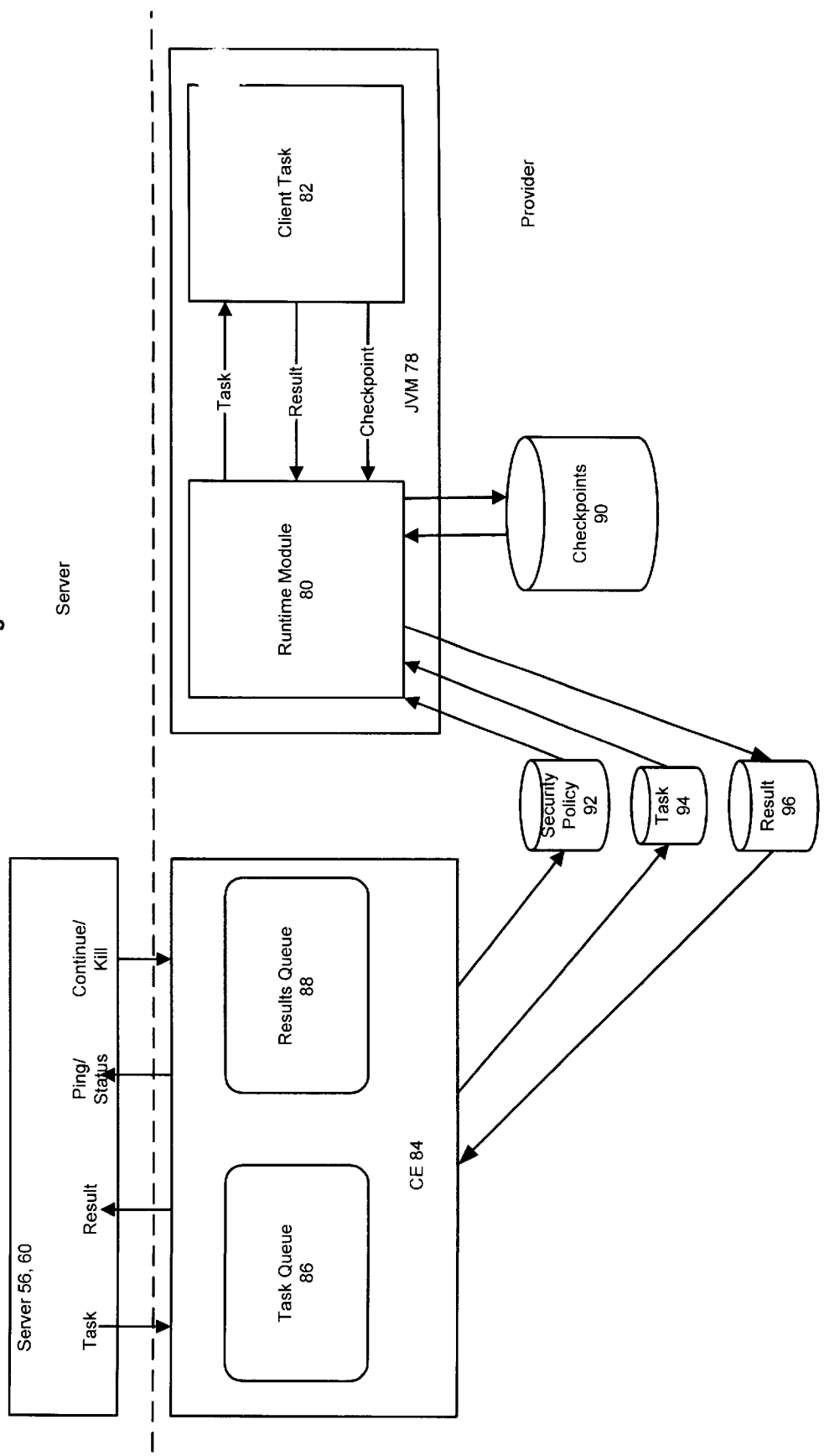
FIG. 3 illustrates one embodiment of the CE architecture of the present invention.

Referring to FIG. 3, one embodiment of the CE architecture of the present invention is illustrated. The CE is the software unit that resides on a provider computer and accomplishes the timely and secure execution of client tasks. The CE 84 manages the interface between the provider computer and the server of the present invention, monitors the state of the provider computer's machine, schedules the execution of tasks on the provider computer, and manages all communication with the server of the present invention. For example, the CE 84 receives tasks from the CTS, posts results to the server, provides status of tasks and receives messages to remove, suspend or resume tasks.

The CE 84 can be configured to execute tasks continuously, albeit at low priority (so as not to interfere with a provider's normal use of their computer), or to start execution of tasks when a provider's computer is idle (i.e., not being interactively used) and stop execution immediately upon provider interaction with their computer. In this way, the CE is designed to be unobtrusive to the provider.

CE 84 communications with the server and execution of tasks occur independently. For example, even if a provider is actively using their computer, the CE communicates with the server, provided a network connection is available (e.g., when a provider has dialed into the Internet). In so doing, the CE receives elements that are placed in the task queue 86 to be executed whenever possible. Thus, obtaining and staging of client tasks takes place at a time independent from the execution of those tasks. Making CE communications independent from CE task execution adds to the efficiency of the overall system.

The CE also includes a dialing scheduler that can be preset by the provider to dial out to the server of the present invention at configurable intervals and only during preset periods. Thus, for example, the provider can direct the dialer to dial out to the server every ten minutes, but only between the hours of 2 a.m. to 4 a.m.

The entire CE resides on the provider computer, which as noted earlier, can be any form of computer having excess capacity. For example, but not intended as a limitation, provider computers that run the Windows® operating system, the Macintosh® operating system, the Linux® operating systems and others are all candidates for use with the present invention.

Various security measures are taken in executing tasks using the present invention. The CE uses a virtual machine 78 to execute client tasks 82. Examples of virtual machines, but not intended as a limitation, include the Java Virtual Machine and the C# Virtual Machine. Throughout most of the remainder of the discussion we refer to the CE virtual machine as the Java Virtual Machine or JVM 78.

Security restrictions on the virtual machine prevent client tasks from accessing resources on the provider machine directly. For example, within the CE, the virtual machine is altered such that only encrypted tasks provided by the server can be executed. This both protects tasks when stored on disk and ensures that the CE executes only valid tasks. Further, the system has the option of encrypting everything that is written to disk both in the provider computer and on the server.

Figure 4A:
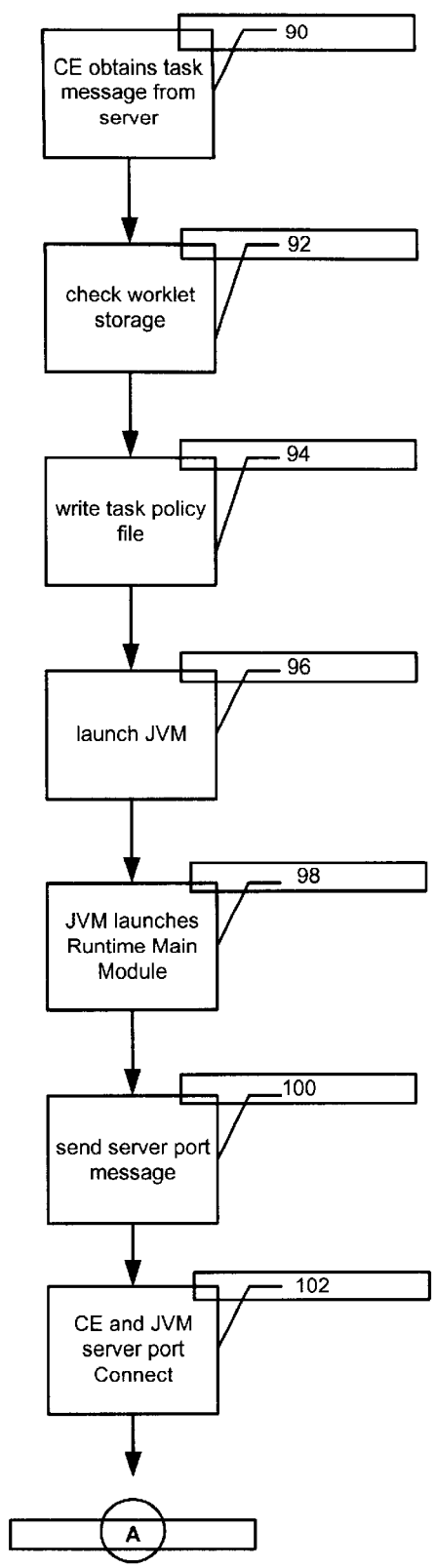
FIGS. 4A and 4B illustrate a normal execution scenario for tasks.
Figure 4B:
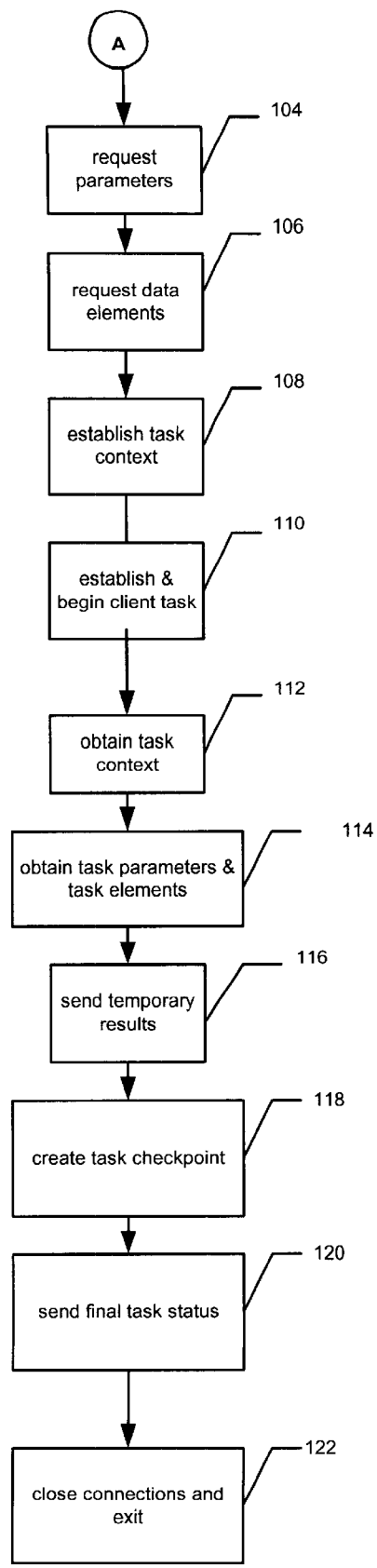

Referring to FIGS. 4A and 4B, a normal execution scenario for tasks is illustrated.

It is important to note that the CE 84 a highly capable application. It has the ability to run tasks constantly at low priority so that a provider's normal use of the computer is unimpeded; alternatively, it can actuate in much the same way that a screen saver actuates, executing tasks only when a provider is not using their computer. In practice, the CE will exercise a small window that will be visually perceptible by the user of a particular computer of the present invention. When the computer is idle for a configurable period of time, the CE window will "pop up" with the cursor within the CE window. Alternatively, if the user so desires, the application window can also simply be illustrated with an actual screensaver, but the description below assumes the CE window is an application window.

The CE window activity is independent from the execution of tasks, but can be synchronized with such so as to provide, among other things, status information about the execution of the current task. Various buttons and areas within this CE window will be accessible to the user such that accounts can be accessed, amount of time associated with use of the users computer can be determined.

The graphic window of the CE is displayed for the provider when the CE detects the host computer is idle. Its presence indicates to the provider that the system is processing, or is ready to process tasks in the queue, and has a number of functions. The window can show the state of processing, that is whether tasks are being processed at a particular moment or not. Further, within the window are located various other buttons that may be clicked to determine the status of the provider's account. In addition, advertising or other messages may be presented in the CE window, which will allow a user to proceed to a particular website to view further information concerning the messages. Thus, the CE window can operate in the nature of a browser.

The size and placement of the CE window during "pop up" is configurable by the user. When the CE window is displayed, the system seizes control of the cursor and locates it at any configurable spot within the CE window. Thus the cursor can be placed in a spot where messages are to be displayed or in a location to actuate any functionality that is available to the provider while the CE is operating, such as the quick disappearance of the display window as described above.

The user can also confine the CE to a system tray if desired. In this case, the icon or panel in the tray can be used to indicate, among other things, engine status, the arrival of new display content or upgrade packages, or Internet connectivity status. Alternatively, the CE can be configured and executed as a "daemon" having only a command-line user interface.

The CE also supports the dynamic display of marketing content in the CE window to the provider computer. The server notifies the CE when new content is available and where it can be downloaded.

In the event that the user desires to use the computer for purposes other than to run elements of the present invention, the user will simply type a key or cause the cursor to be moved outside the CE window. As soon as this occurs, the CE will shut down all of the processing of the present invention in an orderly fashion. Alternatively, the CE can be configured to execute tasks constantly, albeit at low priority, in which case the CE window can be made to disappear as described above, yet tasks will continue execution at lower priority.

If the user would like to interact with the window, then a single click anywhere on the window will cause it to enter a new state where it will not automatically disappear. This contributes to the ease of use of the CE. This state is exited when the user closes the window or after a period of inactivity.

As noted above, there are a series of execution steps when a CE is running on a user's computer. For example, and referring to FIGS. 4A and 4B at the outset, the CE obtains a task message from the server 90. The executable elements from the element server are written to the disk of the computer. However, before writing any items to disk, the disk management logic within the CE ensures that any such storage will not cause the CE to exceed its storage space budget 92.

The CE then writes out the task policy file that establishes the permissions for the Runtime 80, and the task to be run 82. This task policy ensures that the client task can neither access the provider computer's disk or the network. The runtime policy gives the runtime module 80 access to data elements need to run the task (if any) and authorizes the runtime module 80 to connect back to the Core Engine. The CE then launches the virtual machine (JVM) 96 and executes the Runtime 80. The path of the policy file, the security manager, the maximum size to be used based upon the CE's memory budget, and the class path including all executable elements, are passed to the JVM 96. The class name for the task and the CE communications port are also passed as parameters to the runtime module 80.

The JVM then launches the Runtime main module 98. This runs in a protection domain that allows the Runtime to open a network connection to the CE and to read executable and data elements from the disk. The JVM opens a server socket, connects to the CE port passed in on the command line, and sends a message containing its server port 100.

The CE then connects to the JVM's server port. This results in two connections between the CE and the JVM, i.e., a CE to runtime channel, and a runtime to CE channel 102. The runtime requests the parameters for the task over the runtime to CE channel 104 and the CE returns those parameters in response over the CE to runtime channel.

The runtime then requests the data elements for the task 106 over the runtime to CE channel, and the CE returns them in response over the CE to runtime channel.

The runtime then establishes a task context that the task uses to communicate with the runtime system 108.

The runtime establishes and begins the client task 110. The executable elements for this task having been provided to the runtime via the class path provided for the JVM when the JVM was started. The client task then runs in a separate protection domain that prevents it from accessing the network or the disk. This protection domain is established through the permissions granted to the task in the task policy file.

The client task interacts with the runtime through the task context object established for it by the runtime 112. The runtime calls run with the client tasks privileges when possible. If the runtime needs to perform an operation requiring additional privileges, i.e., accessing a particular data element, the runtime executes a privilege block that takes on the minimum privilege for the minimum amount of time required to complete the operation.

The client interacts with the runtime to get task parameters and to access task elements 114. As an optional step, when the client task can send out temporary results using the set status call to the runtime 116, these results are passed to the CE over the runtime to CE channel. The CE then sends these interim results in the form of a task status to the server.

As an additional option, when the client task can create a task checkpoint using the checkpoint call to the runtime 118, the checkpoint is passed to the CE over the runtime to CE channel. The CE serializes the checkpoint to disk so it is available in case a task restart is required.

When finished, the client task does a set status runtime call 120 with the final results and exits. The results are passed through the CE over the runtime to CE channel. The CE then sends these results in the form of a task status message to the server. After the CE sends a final task status noting that the task is complete 120, the space that is consumed by the task definition and related data can be reclaimed for use in running other tasks.

Once the task completes 122, the runtime closes down its connections and exits.

As noted above, the CE is a very flexible program that does not impair the ordinary use of the computer in any way. For example, when the user moves the mouse cursor outside of the CE window, the CE sends a shut down request to the Runtime. If the JVM does not shut down in seconds, the JVM is automatically stopped. When the Runtime receives a shut down request, it calls the clients task stop method. The client is allowed to send a set status and create a checkpoint before exiting. This reduces the loss of work and allows the program to restart at the checkpoint when processing resumes later. If the client task supports checkpointing, the runtime sends the checkpoint back to the CE on the runtime to CE channel. If a checkpoint is received, the CE writes it to disk. Once the client task exits, the runtime closes its connections and exits.

If the CE has been configured to execute tasks intermittently based on user interaction (versus continuously), then when the CE detects that the PC has been idle for a configurable period of time, and thus is available to run a task, it checks its queue for a paused task, and restarts the task from the last checkpoint which was previously stored on disk, using the same mechanism used to start the task at the outset. If there was no paused task, the next task in the queue is run.

It should be noted that the CE functionality, while used in the present invention, could also be used in other fashions. This would, for example, allow particular programs to be run within a given office, thereby utilizing the full power that is available on all PCs within an office location. Again, processing occurs whenever the computer is idle and ceases whenever the individual PC user desires to use the PC for specific purposes.

The centralized task server (CTS) intermediates tasks submitted by a client application time and the CEs on providers' computers that have excess computational capacity to run those tasks. The CTS registers clients, accepts tasks for execution, distributes those tasks to computers, receives results back from the provider computers, conveys results to the client computers, charges clients for the computational work performed and pays providers for the use of their computers.

One of the most critical functions of the CTS is task scheduling. Part of the scheduling process is to provide clients of the present invention, who desire to obtain the aggregate computational power, with the desired amount of processing power on demand.

The server of the present invention loads tasks onto a single provider computer based in such a way as to match computer capability with task requirements. As tasks are completed, and through the communications channel between the provider computer and the server, additional tasks are fed to the provider computer for execution. All new tasks are placed in a task execution queue on the provider's computer for subsequent execution. To provide maximal control of the execution of tasks on a provider's computer, the CE supports the concept of task priorities and task preemption (tasks can preempt executing tasks of lower priority). These features allow the server to more effectively utilize available provider computer resources.

In order for the server of the present invention to correctly characterize the provider's computer, the server also collects usage and performance histories (profiles) from the provider computer concerning a wide variety of parameters. For example, the server collects Internet connectivity patterns and processor availability patterns during the course of any 24-hour period, weekly period, monthly period, etc. The processing power of the processor itself is also important since certain clients may request higher or lower processing power depending on relative cost and timeliness tradeoffs.

To fulfill its function, the task scheduler must fulfill the following requirements: The task scheduler gets jobs and associated tasks from clients. It must then take those tasks and distribute them to various provider computers for execution. It must also record the fact that it has assigned a particular task to a particular provider computer.

The task scheduler passes both interim and final results to the client and records the amount of work performed to an on-line ledger. It then credits a provider's account with the amount of time that the provider computer actually performed on the specific task. This allows the provider to be paid by the computational work that it has contributed to a particular job. (By definition, time multiplied by the power of the provider computer equals work performed.)

The task scheduler also logs completed work in a client's account noting the amount of work performed so that an appropriate billing can be passed on to the general ledger module for billing to the client.

Cancellation of tasks or jobs (collections of tasks) from a client is also processed by the task scheduler. It accepts any job cancellation from the client and insures that appropriate communication is sent throughout the system of the present invention canceling a particular job.

When a client job is completed, the task scheduler automatically provides e-mail or other automated notification to the client that the job is complete.

Results that are received by the task scheduler are archived if the client has not retrieved those results. From time to time the task scheduler deletes unclaimed information from the data archive.

Since clients pay for the computational power they use, the task scheduler periodically checks the on-line ledger to determine if a client has exceeded an account limit. If so, the task scheduler notifies the client and, if necessary, cancels all jobs for the client until such time as the account is brought current.

In the event that a particular provider computer that is working on a particular task does not respond for a pre-set period of time, the task scheduler moves the task to another provider computer. Thus, it must be able to detect unresponsive CEs on provider computers. Depending upon the time constraints and priority of tasks involved, the task scheduler also can elect, through its software, to launch redundant tasks to different provider computers to insure timely completion of any particular task.

The CTS is also tasked with delivering the appropriate amount of compute power for a client task, not more or less, for a given client. Since charges for the client are made in part based upon the compute power delivered, this assembly of provider computers and delivery of computational power must be accurate.

In order to assure responsiveness to clients, the task scheduler also balances data processing loads among the various provider computers based upon the capabilities of the provider computer and the bandwidth that is available to provide elements and tasks to provider computers.

The CTS collects statistics regarding provider computer capabilities. This is critical for both assigning payment to a provider and a debit notice to the client. It is also important that the CTS know at all times the cap ability of the provider Computers.

As noted above, the CTS may send the same tasks to more than one provider computer. This helps the CTS be assured that the computations that are performed by the assign ed provider computers are correct. Since results from provider computers should be the same for the same task (unless randomization is integral to the calculation of the task), any differences in response are noted by the CTS and resolved. This assures the client that answers are accurate.

The CTS takes explicit measures to protect the intellectual property inherent in a task. To accomplish this, the CTS obfuscates executable elements and data elements to remove contextual clues to the code's intended purpose. Furthermore, the CTS also removes from tasks all traces of client identity. Thus, unless specifically intended otherwise by the CTS, a provider has no means of knowing the clients for whom elements are executed nor their domain of inquiry.

To characterize and assess the capabilities of provider computers, in order to perform task scheduling effectively, the CTS executes certain benchmark tasks on provider computers. Also, various test tasks with known results are sent to the provider computer to ensure that results returned by the provider computer are accurate. Unexpected results from a provider can be used to identify attempts to submit fraudulent results or otherwise tamper with the normal execution of the system of the present invention.

In operation, the present invention allows the client to specify job and task parameters via the client interface. Using the client interface, the Client selects desired attributes of nodes in a virtual cluster. These attributes include, but are not limited to, CPU speed (in GF), memory, available disk space, intermittent or constant connectivity, bandwidth (in Kbps), number of nodes, and reliability (as measured by consistency of results). The client also provides information on his job: estimated work per task (in GF-Hours), incoming data (in MB), outgoing data (in MB).

To deliver a virtual cluster with the desired attributes, the CTS may construct virtual nodes (one or more nodes operating on the same task so as to improve the expected time-to-completion of a given task). Virtual nodes are discussed in more detail elsewhere in the document.

After the client defines the tasks to be executed, they are provided to the central server of the present invention for "launching," i.e., the placement of the task in a queue for scheduling and ultimate distribution to provider computers. For billing and compensation purposes, a task is "launched" when it is scheduled. In this way, the latency from a task sitting in queue is attributed to the provider computer and so considered part of the provider computer's intermittent "unavailability".

The system of the present invention records the time at which each task is launched to the first provider computer in a virtual node. The system also records the time at which the first completed task is returned from a virtual node. At any point in time, the amount of power running through the virtual cluster is the sum of the powers of the virtual nodes running.

The system constantly monitors virtual nodes for possible failure. Failure is defined as an absence of communication from a configurable number of provider computers in a virtual node for a configurable amount of time. When a virtual node fails, the task assigned to it is re-launched on another (perhaps faster) virtual node.

Below we describe a novel pricing model and task scheduling model for use with the system of the present invention, but neither is intended as a limitation.

Figure 6:
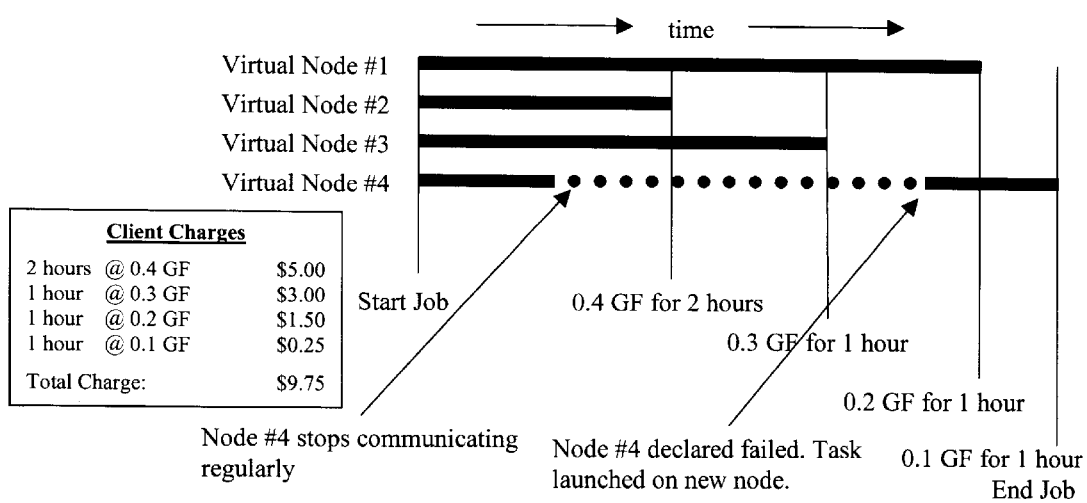
FIG. 6 illustrates a determination of processing time of virtual nodes.

At any point in time, the client can be billed. The client charge is the price per hour (based on power running through the cluster) for each hour (or portion thereof) since the last billing. For example, and referring to FIG. 6, the determination of running time on providers' computers is illustrated. In the example, each virtual node in the cluster operates at 0.1 GF. The client is charged an hourly rate for running tasks based upon the power, P, running through the client's account at each 15-minute increment. The price per hour for computation is:

$$\text{Price per hour for computation} = 4.5 + 0.296 P^{1.0155}$$

where 4.5, 0.296 and 1.155 are configurable constants.

Figure 7:
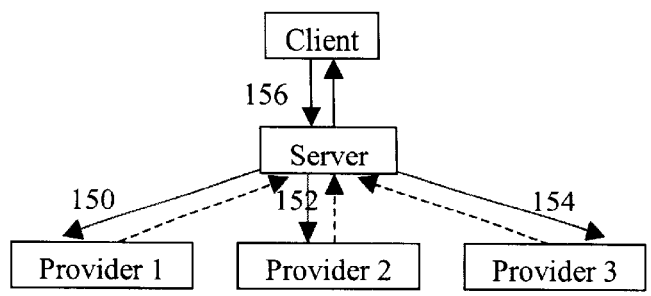
FIG. 7 illustrates communications paths of the present invention.

The client is charged an additional amount per GB for data transferred through each of the four communications paths, 150, 152, 154, and 156 of the present invention as illustrated in FIG. 7. The communications paths 150, 152, and 154 represent duplicated data and are a function of the degree of reliability the client achieves. Of the dashed arrows, only one will be executed, and so the client will be charged for only one of these paths.

The client is also charged for data transfer during the course of executing the particular tasks of the client. For example, let $d_i$ be the quantity (in GB) of data transferred from the client to the server. Let $d_o$ be the quantity of data transferred from the server to the client. Given that some of the data will be duplicated for processing by virtual nodes comprised of more than one provider computer, the client's total data transfer charge is given by the following:

$$\text{Total Cost of Data Transfer} = g(d_i + d_o)\left(\frac{\ln(1-r)}{\ln(1-\pi)} + 1\right)$$

where 9 is the transfer cost per leg per GB, r is the requested node reliability, and $\pi$ is the average provider computer reliability.

Requested node reliability r can be defined for a virtual node of CPU speed C and bandwidth B as the probability of the virtual node completing a task in no more time than the time it would take a fully idle, constantly connected computer with CPU speed C and bandwidth B to complete the task.

Average provider computer reliability $\pi$ is defined as the probability of the provider's frequency of contact not diminishing, in the near term, from the provider's historic average.

The client is also charged an hourly premium for requesting reliability greater than a set baseline reliability. The charge per hour is:

$$\text{Price per hour for premium reliability} = kCN\left(\frac{\ln(1-r)}{\ln(1-R)} - 1\right)$$

where k is the baseline price per MHz-hour (provider computer price per hour for the ideal machine), C is the CPU speed requested of the virtual nodes, N is the number of virtual nodes running, r is the requested reliability, and R is the baseline reliability.

Provider Payments and Task Scheduling (Simplified Version)

As clients are charged for provider computers' time, so must the providers be paid for the computer time they provide. For each provider computer, a CPU availability rating, $a_c$, is constructed along with a bandwidth availability rating, $a_b$. These ratings measure the average availability of the provider computers' CPU and bandwidth over time. Unlike in the full version of the task scheduling model (described below), these ratings are single values versus vectors.

To measure availability, the system of the present invention records transitions of CPU and bandwidth (between "available" and "unavailable") over time. Defining each minute of availability as having value 1 and each minute of unavailability as having value 0, the system takes the moving average of these values over the past seven days to obtain average availabilities for CPU and bandwidth.

For each provider computer, the system next measures CPU speed, C, and bandwidth, B (through benchmark tasks). These measures are periodically updated to ensure that the system has knowledge of the full availability of the provider computer's system.

The client may provide estimates of the work w, data in di, and data out, do associated with the task. If the client does not specify these measures, the system uses the averages for a sampling of tasks.

The system then computes the expected time-to-completion for the task usin the following formula:

$$\text{Expected Time-to-Completion} = T_E = \frac{w}{Ca_c} + \frac{d_i + d_o}{Ba_b}$$

As noted earlier the client specifies the CPU speed, $C_v$, bandwidth, $B_v$, and reliability, r, of a virtual node. If reliability is not specified, the system of the present sets a default value for the baseline reliability R. The client may select a greater, but not lesser, reliability.

The system then computes the implied "requested" time-to-completion for the task as:

$$\text{Requested Time-to-Completion} = T_R = \frac{w}{C_v} + \frac{d_i + d_o}{B_v}$$

The subset of provider computers that satisfy the following criteria are considered "candidate provider computers":

The provider computer is not working on a paying job.

When the client specifies w, $d_i$, and $d_o$, the provider computer has (approximately) $T_E = T_R$.

When the client does not specify w, $d_i$, and $d_o$, the provider computer has (approximately) $a_c C = C_v$ and $a_b B = B_v$.

Taking provider computers' CPU's and CPU availabilities as fixed, candidate provider computers have expected bandwidths (bandwidth multiplied by bandwidth availability) that satisfy the following equation:

$$Ba_b = Ca_c \frac{(d_i + d_o) C_v B_v}{w B_v (Ca_c - C_v) + (d_i + d_o) Ca_c C_v}$$

For each candidate provider computer, the system calculates the weighted average availability, π, as:

$$\pi = \frac{a_c \frac{\overline{w}}{C} + a_b \frac{\overline{d_i + d_o}}{B}}{\frac{\overline{w}}{C} + \frac{\overline{d_i + d_o}}{B}}$$

where the bars indicate the average over a sampling of tasks.

Selecting randomly from the candidate provider computers, the system arbitrarily groups the provider computers into virtual nodes such that the probability of the virtual node returning the task in, at most, $T_R$ equals r. Specifically, the system randomly picks provider computers from the subset and groups them into virtual nodes such that, for reliability r, and N nodes, each with weighted availability $\pi_i$, $$r = 1 - \prod_{i=1}^{N} (1 - \pi_i)$$

It is important to note that the value of N that satisfies the equation may be non-integer. In this case, the server will launch a different number of duplications of each task such that the average number of duplications per task equals N.

The system launches the task simultaneously on all the provider computers that comprise a virtual node. As noted earlier the task is "launched" when it is scheduled. When the first provider computer returns the completed task or when the client cancels the task, all duplicate tasks on remaining provider computers are cancelled. We define "cancelled" as the placing of a "remove task" command in the queue. A particular provider computer's task is considered concluded when the first of the following occurs:

The provider computer receives notice that the task has been cancelled.

L hours pass since the task was cancelled.

For each provider computer, the system computes the time that elapsed between the launching of the task and the conclusion of the task. The amount of work the provider computer completed is estimated as the time that elapsed multiplied by the provider computer's power rating. Note that, effectively, the provider is being paid for time, not work. However, because the provider computer's power rating is a function of the provider computer's availability, the rate of payment the provider receives is a function of the average work per unit time the provider computer completes over time.

Providers are paid a fixed amount per unit time. The system established a target annual payment per MHz-hour, k, and a baseline reliability, R. A provider computer with a weighted average availability of π and CPU of C is paid $$\frac{kC \ln(1 - \pi)}{\ln(1 - R)} \text{ per hour.}$$

This assumes that the provider computer is working over the whole interval from launch to conclusion of the task.

Provider Payments and Task Scheduling (Full Version)

As part of establishing a given provider computer as a viable source of computing power for the system, for each provider computer, the system constructs a CPU signature and a bandwidth signature. These signatures show the probabilities of the provider computer's CPU and bandwidth being available for a fixed time interval over time. For example:

| Beginning of Time Interval | Pr(CPU available) | Pr(Bandwidth available) |
|---|---|---|
| 1 | 30% | 0% |
| 2 | 40% | 10% |
| 3 | 50% | 20% |
| 4 | 40% | 30% |

The number of intervals should be enough to cover a reasonable circadian "cycle" (e.g. 1 week). The signature should be updated periodically.

For each provider computer, the system measures CPU speed by sending to the provider computer certain benchmark tasks that have known response times. The bandwidth is also measured. As noted earlier, these measures are periodically updated.

Figure 8:
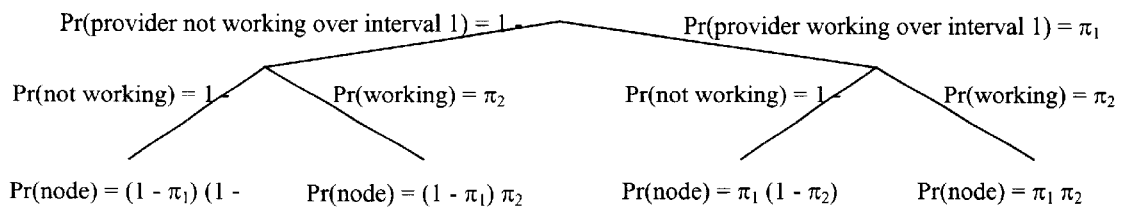
FIG. 8 illustrates expected time for completion of a task probability.

The system then combines the signatures with CPU speed and bandwidth to construct a profile matrix. The profile matrix shows the probabilities of the provider computer completing a task of given work, input data, output data, and time of launch within certain time lengths. Example: The tree below shows all possible paths of success and failure of a provider computer working toward completion of a task. Each step down in the tree represents a time increment. Left branches represent failures to work. Right branches represent successes toward work. Probabilities are associated with each branch based on the CPU and bandwidth signatures. The expected time-to-completion is the sum of the products of the probabilities of reaching each terminal node and the times required to reach the nodes. This concept is illustrated in FIG. 8.

The client specifies the CPU speed and bandwidth of a virtual node. The system finds all provider computers that have an expected time-to-completion equal to the time-to-completion for a fully available node with the specified CPU speed and bandwidth. Call this time-to-completion the "desired time-to-completion".

The system of the present invention arbitrarily groups these provider computers into virtual nodes such that the probability of the virtual node returning the task in the desired time-to-completion equals some fixed value.

The system then launches the task simultaneously on all the provider computers comprising the virtual node. When the first provider computer returns the completed task, the duplicate tasks on the remaining provider computers are cancelled.

The system computes the work each provider computer performed from the time the tasks were launched until the first task was returned. We calculate work as the number of hours the provider computer worked multiplied by the provider computer's power rating.

Providers are paid a fixed amount per unit work. Payment is made on a per GHz-hour rate, T, and a target reliability r. A provider computer with an average (based on average task attributes and over all time intervals) availability of $\pi$ is paid $$\frac{T \ln(1 - \pi)}{\ln(1 - r)} \text{ per GHz-hour.}$$

Figure 5:
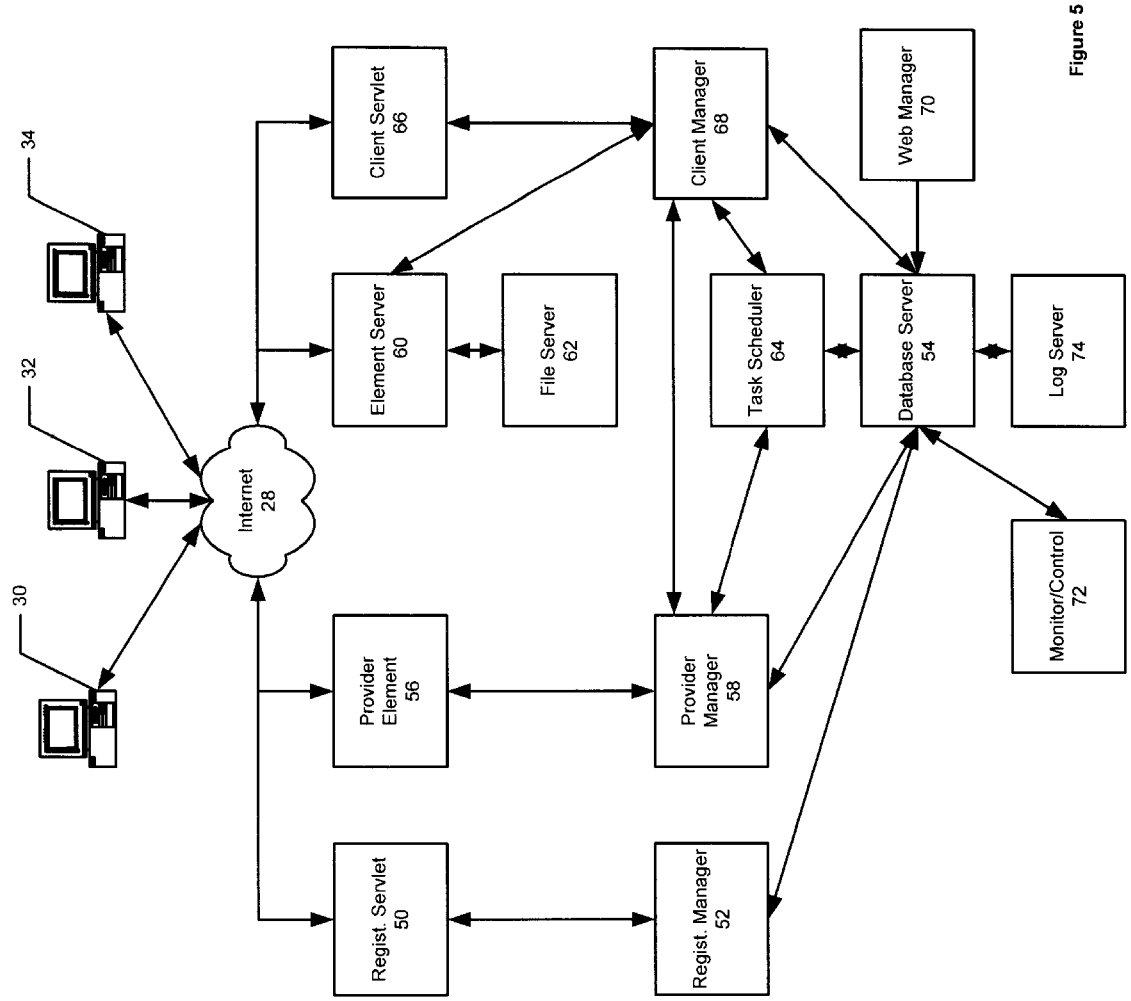
FIG. 5 illustrates an overall architecture of a server of the present invention.

Referring now to FIG. 5, the overall architecture of the server of the present invention is illustrated It should be noted at the outset that while single modules may be described, multiple instances of each such module may, in fact, be present in the architecture in order to allow for scalability to larger operations, to increase reliability so that no single point of failure exists in the system, or to have multiple instances of the entire server located at different physical locations to allow for redundancy and insurance against failure.

The server comprises a registration servlet 50, which accepts registration requests over the network 28 from clients and providers who wish to participate on the system. Registration information is sent by the registration servlet to the registration manager 52 for processing.

The registration manager 52 receives appropriate information from the registration servlet 50 and assigns the client/provider computer to a database. The registration manager then generates a certificate and returns the certificate in the response to the client/provider computer. The provider computer certificate includes the provider public key, the provider-id (which is a hash of the provider public key), and the provider database ID. The client certificate comprises the client/user public key, which then acts as the client/user ID, the client ID, and the provider computer database ID.

The provider servlet 56 accepts various messages from providers as will be discussed more fully below, and routes them to the appropriate provider manager 58. Further, the provider servlet 56 returns responses from the provider manager to the various provider over the network 28. The web server of the present invention encrypts and decrypts requests, authenticates requests, routes them to the appropriate servlet, encrypts and returns responses. The provider servlet accepts GET and POST messages from providers. (These messages will be more fully explained below).

Provider manager 58 manages the interaction of the system of the present invention with the various providers. The provider manager receives and routes requests from other internal server components such as the client manager 68, the task scheduler 64, and the database server 54. All administrative information and processing that relates to providers is managed by the provider manager 58.

The element servlet 60 is used as the point where data elements and code are exchanged between clients and providers over the network. Elements are executables, or portions of executables that are to be run on provider processors. Elements are uploaded to the element servlet that then stores them on the file server. When a CE receives a task assignment from the CTS, the CE downloads the required elements for that task from the element servlet. File server 62 stores data and executable elements that are to be exchanged between clients and providers. Client servlet 66 accepts various messages from clients and routes them to the appropriate client manager 68. Client servlet 66 receives responses from client manager 68 and returns the response to the client. Since responses to and from clients proceed over network 28, the client servlet is invoked by a web server that is responsible for encryption, decryption, and authentication.

The client servlet also manages sessions with a client. This is accomplished by the client servlet assigning a cookie to the particular client for the particular session. If a request is received from a registered client and the request comes without a cookie, a new session cookie is created and sent to the client by the client servlet. In this fashion, individual sessions can be identified and managed.

Client manager 68 is responsible for managing requests to and from clients. Client manager 68 maintains a valid message channel for each client session. When the channel is established, the client servlet accepts GET and POST requests and forwards them to the appropriate CM. The client manager uses business routines within the client manager to handle POST requests. Depending on the type of requests, such processing may involve interaction with the database server 54, the task scheduler 64, and/or the provider manager 58. A GET request is handled by the client manager 68 by returning the appropriate message from the client output queue (explained below).

Task scheduler 64 manages the assignment of tasks to providers. The task scheduler is responsible for tracking the states of the various providers, that is, whether the providers are currently processing tasks, whether the providers are available, and, without limitation, whether the provider has the appropriate processing power to process the specific tasks that may be necessary. The task scheduler 64 receives messages from client manager 68 and provider manager 58 regarding any changes in the status of clients and providers. When tasks are assigned to specific providers, the client manager keeps a record of such task assignments in the database 54. Various algorithms present in the task scheduler ensure that appropriate tasks are assigned to the appropriate providers given priority of tasking and other prioritizing data.

Database server 54 stores information on clients and providers. To accomplish this task, the database server 54 comprises an account database relating to providers and revenue accumulated by providers, a client database relating to the identity and contact information for clients, job and task information, and a provider database relating to providers and identification and contact information for providers. Such information, while shown as being located on a single database server 54 can also be located on multiple servers to so that the system can be scaled up to handle many more users as well as ensure privacy and security of the information.

The web manager 70 intermediates access between the account section of the web site and the database. The web manager 70 supports the web based registration, update of registration and account information, and retrieval of account-specific and system-wide statistics.

Monitoring and control module 72 comprises a set of utilities that support the overall management of the system of the present invention. The monitoring and control functionality 72 provides graphical user interfaces for system operators to monitor the health of the overall system. The monitoring and control functionality 72 polls all servers for health information in the form of name-value pairs that contains status information and related attributes to all of the servers. In this fashion, the monitoring and control 72 can keep track of the health of the entire system. The monitoring and control module can also respond to asynchronous notification of system events from servers.

Log server 74 contributes to the health of the overall system by collecting debug and error log data. Any errors that are encountered throughout the system whether they are in clients, providers, or any of the servers of the system are collected in the log server for subsequent analysis and debugging where necessary.

As noted above, while single instances of the various modules have been indicated in FIG. 5, this architecture is not meant as a limitation. Additional instances of any given component may be added to response to increases in demand from clients or increases in the inventory of providers. For example, database server 54 comprises information on clients and providers and is partitioned into two databases, one for a client database, and one for a provider database. These databases can run on a single server or on dedicated servers. As the number of clients and providers increases, additional databases can be added.

Client servlet 66 and provider servlet 56 are stateless, therefore allowing additional components to be easily added to increase capacity. When a client request comes in over network 28, the requests are allocated among available client servlets to increase the response. The same holds true for the provider servlet 60, thus allowing responses to and from providers to be rapidly responded to.

Element servlet 60 is also stateless, thereby allowing additional components to be easily added to increase capacity as well. Thus, a large number of element servlets may potentially exist which store elements on a given file server. Clients and providers allocate their requests and elements across the element servlets.

File server 62 will store large amounts of client data. Additional servers can be added to the system to increase this capacity. Thus, it is within the scope of the present invention to have multiple file servers 62.

Provider manager 58 and client manager 68 can also be augmented by additional client and provider managers respectively. Each client is assigned to a specific client manager. This is accomplished by assigning clients to groups, with the group subsequently being assigned to a client manager. For example, client manager 1 may handle groups 0–49, and client manager 2 may handle groups 50–99. When a new client manager is added, clients are reallocated among the various client managers in order to ensure the most efficient flow of messages among the elements of the system.

Task scheduler 64 can quickly become a bottleneck when multiple clients and providers begin to grow. If this is the case, additional task schedulers can be added to manage a subset of tasks flowing to and from a provider. Again, tasks and providers can be assigned to groups with groups being subsequently assigned to specific task schedulers. Again, as task schedulers are added, a real allocation of tasks and providers among the various schedulers is accomplished in order to even the workflow and ensure the most efficient functioning of the system of the present invention.

In a similar fashion, web manager 70 can be augmented by additional instances of web managers with requests being allocated among the various web managers. The monitoring and control module 72 can also be represented by multiple instances of the monitoring and control function. There can also be multiple instances of the log server 74. However, there must be close coordination among the various log servers so that any trends and errors can be detected and corrected.

Registration servlet 50 can also be augmented by additional components. Clients and providers are assigned across the various instances of registration servlets.

The task scheduler 64 maintains an in-memory model of the state of all of the providers (i.e. the provider profiles) and any tasks that it manages. information to establish the task scheduler is initially retrieved from database 54. It is thereafter updated as messages are received from the provider manager regarding status of efforts of the various providers, and from the client manger, which forwards relevant messages from clients to the task scheduler.

The task scheduler also requests additional information about providers by cuing a get task message (for retrieving task status) or a get cache contents for obtaining the cache contents of the server for the provider. The task scheduler comprises various scheduling algorithms. This task scheduler makes initial assignments of tasks to providers and migrates tasks from one provider to another if necessary. When the task scheduler schedules a new task, it records the assignment of the task and the provider to which it is assigned in the task database 54. It further queues a task message to the provider. When migrating a task, the task scheduler removes the task from the current provider by cuing a remove task message, assigning the partially completed task to a new provider via a task message. All such operations are reported in the task database.

The element servlet is the entity that stores data elements that are to be assigned to providers for processing. Clients upload their data elements to the element servlet 60. The element servlet authenticates the client as one that is permitted to store elements in the file server 62. If the client is authenticated, the element servlet 60 stores the object in a physical location on the file server 62 and notifies the client manager 68 that the object has been uploaded. The client manager 68 in the client database 54 then records this information.

Client computers download elements to the element manager. The element manager 60 registers the fact that this has occurred to the client manager 68.

The notification that is provided by the element servlet to the client manager 68 includes the client ID, a locator for the data element, and the physical location of the data element.

When a provider needs an element, it makes a request to the element servlet 60 over the Internet 28. The element servlet 60 authenticates the provider, decrypts the ticket that the provider offers to the element servlet, compares the ID of the provider making the request with the provider ID and the ticket. If the ID's match and the ticket has not expired, the element servlet 60 looks up the element on the file server 62 and returns it to the provider for execution.

When the client terminates a particular job, all of the elements associated with that job are marked as deleted. Deleted elements are removed from the file server 62 and from the database 54.

Communication within the system of the present invention among the CE, the CTS, and the client is governed by a communication protocol unique to the present invention. At the high level, separate message and data channels exist. Messages between the CE and the server occur over the message channel while executable and data elements go over the data channel. Executable and data elements are referenced from messages passed over the message channel.

The message channel is implemented above a low-level protocol that is part of this invention. The low-level protocol supports the secure and reliable transmission of messages between system components (CE, client, CTS).

The protocol is secure because it is built on Secure HTTP (HTTP over SSL). The invention uses SSL to both provide confidentiality (encryption) of transmitted data and to authenticate the parties at each end of the connection. Providers and client applications can only access the server if they have a legitimate certificate. In fact, the server uses a hash of the client's public key as a client identifier.

The protocol is reliable because it incorporates sequence numbers, acknowledgement, and retransmission. Combined, these protect against dropped messages, out-of-order processing of messages, and the processing of duplicate messages.

It is worth noting, the low level protocol provides the abstraction of a bi-directional communication channel between components even though it is implemented on top of HTTP that has a request-response model. A bi-directional model is simulated by having the client periodically "poll" the server for messages. This poll is done on an exponential decay to limit the amount of traffic generated by polling. If the CTS does not respond to a particular GET message, perhaps because of heavy CTS load, subsequent GET messages are sent ever more infrequently, according to an exponential decay, until some limit periodicity is achieved. In this manner, heavy CTS can be automatically mitigated through less frequent CE GET requests.

The maximum polling rate is present each time the client and server exchange a high level message. The two basic operations in the low level protocol are the "GET" and the "POST", both of which are initiated by the client. The POST operation sends a new message (or set of messages) to the server. The GET is a poll operation to get any message (or set of messages) that the server may have enqueued for the client. Since the low-level protocol is based on HTTP it takes advantage of that protocol's features for multipart messages and different message encodings (e.g., for compression). Further, multipart messages can be sent in order to maximize communication efficiency. All messages are also subject to data compression to limit the volume of data being transmitted and to conserve bandwidth.

The low-level protocol also supports the concept of session. Sessions are implemented using cookies and provide for the resetting of a communication channel in the event that synchronization is lost.

The following is a listing of high level message types used by the present invention in its communications protocol. This list is illustrative in nature. Other message types can be added to the present invention as the need arises. As noted above, a series of messages are transmitted between the system and various elements. These messages are characterized as Client-to-Server messages, Server-to-Provider messages, Provider-to-Server messages and Server-to-Client messages.

Client-to-Server Messages

GetConfig:
　This message is sent when a particular client wants to reestablish its configuration. A GetConfig message causes the CTS to send a Config message to the client.

Task:
　The client uses this message to send the server a task to be executed.

ClientProfile:
　The client sends this message on startup and whenever client settings change.

CreateJob:
　Create a new job.

Stop:
　Stop execution of a job or task.

Resume:
　Resume execution of a stopped job or task.

RemoveJob:
　Remove (cancel) a job.

GetJobProperties:
　Requests a JobProperties message.

GetContents:
　Requests a Contents message.

GetExecutableElement:
　Request that an ExecutableElement message be sent describing a particular executable element.

GetDataElement:
　Request that a DataElement message be sent describing a particular data element RemoveExecutableElement:
　Request the removal of the named executable element.

RemoveDataElement:
　Request the removal of the named data element.

Attach:
　Attach to a particular task or job. The attach message is used to subscribe to receive status updates on the identified task or job.

GetTask:
　Request that the identified task be checkpointed. The checkpoint is returned to the client in a Task message.

GetTaskStatus:
　Requests the status of a particular task. The server will send a TaskStatus message in response.

RemoveTask:
　Requests the removal of the named task.

ExecutableElement:
　Register an executable element with the server. The actual executable element data must be downloaded over the data channel.

DataElement:
　Register a data element with the server. The actual data element data must be downloaded over the data channel.

CloseSession:
   Close current session.
Error:
   Report an error condition.
ExternalDelivery:
   Alert the recipient that a message is waiting at a specified URL.
Heartbeat:
   Alert the recipient that the sending entity is still active.
Server-to-Provider messages
Task:
   Assigns a task to a provider.
GetTaskStatus:
   Requests a task status for a particular task. Provider responds with a TaskStatus message.
GetTask:
   Requests a checkpoint for a particular task. The provider responds with a Task message containing the checkpoint.
Config:
   Sent to change the providers server-controlled configuration settings.
GetContents:
   Request contents of providers message queue.
WorkSummary:
   Send current node statistics to CE for display to the user.
GetCacheContents:
   Request contents of provider's cache. Provider responds with a CacheContents message.
DisplayContent:
   Send new display content to CE.
Upgrade:
   Send a software upgrade to CE.
Error:
   Report an error condition.
ExternalDelivery:
   Alert the recipient that a message is waiting at a specified URL.
Provider-to-Server messages
NodeStatus:
   Reports a change in the status of the provider node.
NodeProfile:
   Reports profile information for node (e.g., machine type, available disk, available memory, connection speed, operating system type).
GetConfig:
   Request that the server send a Config message to set the providers server-controlled configuration settings.
CacheContents:
   Reports the contents of the providers element cache. This information is useful in task scheduling.
Contents:
   Reports the contents of the task queue.
Task Status:
   Reports the status of a task. There can be both intermediate and final task statuses. Intermediate task statuses may contain partial results. Final task statuses contain the results of the task. Task statuses are also used to report errors in the execution of a task.
Task: The provider sends the task message out in response to a GetTask message from the provider. In this case, the Task message is a checkpoint of the state of the identified task.
Error:
   Report an error condition.
ExternalDelivery:
   Alert the recipient that a message is waiting at a specified URL.
Heartbeat:
   Alert the recipient that the sending entity is still active.
Server-to-Client messages
Task:
   The server sends the task message out in response to a GetTask message from the client. In this case, the Task message is a checkpoint of the state of the identified task.
Task Status:
   Reports the status of a task. This could be generated in response to a task status from the provider, in response to a GetStatus from the client, or due to an internal server condition.
Config:
   Sent to change the clients server-controlled configuration settings.
JobProperties:
   Report current job properties.
Contents:
   Return contents of job or client global area.
ExecutableElement:
   Return information on a specific executable element. Sent in response to a GetExecutableElement message.
DataElement:
   Return information on a specific data element. Sent in response to a GetDataElement message.
Error:
   Report an error condition.
ExternalDelivery:
   Alert the recipient that a message is waiting at a specified URL.

The present invention can also be employed in other manners, such as a method of marketing computers by offering incentives to computer customers that agree to operate a compute engine (CE) on the computers and having the CE utilize idle computational processing power on the computers. Incentives can include, but are not limited to free computer use, free ISP service, discounted computer sales price, discount computer lease price, a sales rebate, periodic rebates, and usage fees. The CE can also be utilized to deliver "pushed" content, such as advertising, to these computer customers via a display window of said computer's graphic interface or via said computer's sound output.

A system and method for the establishment and utilization of networked idle computational processing power has been illustrated. It will be appreciated by those skilled in the art that other variations in, for example, the calculation of power, and the methods for compensating providers can be accomplished without departing from the scope of the invention as disclosed.

We claim:
1. A system for using computer excess computational power comprising:
   at least one client computer adapted to create programs for execution;
   a network connected to the client computer;
   a central task server (CTS) connected to the network, adapted to receive the programs from the client;
   a plurality of provider computers for providing excess computational power connected to the CTS via network and adapted to receive the programs from the CTS, the CTS thereby providing computational power upon demand to the at least one client computer; and instructions for paying the owners of the provider computers a fixed amount per unit work for providing excess computational power according to a formula:

$$\frac{T\ln(1-\pi)}{\ln(1-r)} \text{ per GHz-hour, where}$$

T is a rate, $\pi$ is an average availability, and r is a target reliability.

2. The system for using excess computational power of claim 1 wherein the at least one client computer further comprises:
a client application programming interface (API) with instructions for allowing the client computer to specify a compute capacity needed in the form of a virtual cluster in which programs are to be run.

3. The system for using excess computational power of claim 2 further comprising client API instructions for collecting parameters to be specified for compute capacity comprising at least computer power, disk space required, and reliability of computer power.

4. The system for using excess computational power of claim 2 wherein the at least one client computer further comprises a run time interface, the run time interface further comprising a set of function calls used by the client computer for getting parameters from the run time environment, for getting data elements, for querying the CTS for task status, and for performing checkpointing at various places in the program.

5. The system for using excess computational power of claim 4 wherein the run time interface further comprises instructions for creating jobs.

6. The system for using excess computational power of claim 5 wherein the run time interface further comprises instructions for creating tasks within jobs.

7. The system for using excess computational power of claim 5 wherein the run time interface further comprises instructions for querying against a status of jobs.

8. The system for using excess computational power of claim 5 wherein the run time interface further comprises instructions for attaching the client computer of a job in progress and for checking on the status of a job while the job is in progress.

9. The system for using excess computational power of claim 1 wherein the CTS further comprises instructions for charging the at least one client for computational power used during the execution of the programs.

10. The system for using excess computational power of claim 9 wherein the charging of the client is made when the task is launched.

11. The system for using excess computational power of claim 10 wherein a task is launched when it is scheduled by the CTS to be run by at least one provider computer.

12. The system for using excess computational power of claim 1 wherein the CTS further comprises instructions for monitoring a virtual node specified by the client for failure.

13. The system for using excess computational power of claim 9 further comprising instructions for charging clients based upon a sum of the computational power of the provider computers running the client tasks.

14. The system for using excess computational power of claim 9 wherein the CTS further comprises instructions for making payments to providers based upon available computational power of the provider's computer.

15. The system for using excess computational power of claim 14 wherein the available computational power is a function of CPU availability, CPU speed and bandwidth availability.

16. The system for using excess computational power of claim 15 wherein CPU speed is measured by running benchmark tests of the CPU periodically.

17. The system for using excess computational power of claim 1 wherein each of the plurality of provider computer further comprises a general purpose compute engine (CE) for executing programs sent from the central server.

18. The system for using excess computational power of claim 17 wherein the CE further comprises instructions for allowing an owner of the provider computer to set availability parameters of the provider computer.

19. The system for using excess computational power of claim 18 wherein the availability parameters comprise amount of RAM available for the programs, amount of disk space available for the programs and times during the day, if any, that the provider computer is available to execute the programs.

20. The system for using excess computational power of claim 18 wherein the CE further comprises instructions for opening a widow on the provider computer when the programs are being run.

21. The system[]for using excess computational power of claim 18 wherein the CE further comprises instructions for displaying content from the central server in the window.

22. The system for using excess computational power of claim 18 wherein the CE further comprises instructions for executing the programs only when excess computational power is detected on the provider computer.

23. The system for using excess computational power of claim 9 further comprising instructions for determining an amount charged to the client I based on a formula:

$$\text{Price per hour for computation} = 4.5 + 0.296 P^{1.155},$$

where P is a sum of all power in active nodes being used by the CTS to fulfill computational requirements specified by the client.

24. The system for using excess computational power of claim 23 wherein the client is also charged for data transfer during the course of executing the particular tasks of the client based upon the following formula:

$$\text{Total Cost of Data Transfer} = g(d_i + d_o)\left(\frac{\ln(1-r)}{\ln(1-\pi)} + 1\right),$$

where $d_i$ in the quantity (in GB) of data transferred from the client to the server, $d_o$ is the quantity of data transferred from the server to the client, where g is the transfer cost per communication path among the client computer, the provider computer and the CTS per GB, r is a requested node reliability, and 7 is an average provider computer reliability.

25. The system for using excess computational power of claim 24 wherein the client is also charged an hourly premium for requesting reliability greater than a set baseline reliability given by the formula:

$$\text{Price per hour for premium reliability} = kCN\left(\frac{\ln(1-r)}{\ln(1-R)} - 1\right)$$

where k is a baseline price per MHz-hour, C is the CPU speed requested of a virtual node requested by the client, N is the number of virtual nodes running, r is the requested reliability, and R is the baseline reliability.

26. A method for using computer excess computational power comprising:
adapting at least one client computer to create programs for execution;
connecting the client computer to a network;
connecting a central task server (CTS) to the network, wherein said CTS is adapted to receive the programs from the client;
connecting a plurality of provider computers for providing excess computational power to the network and adapting said provider computers to receive the programs from the central server, the plurality of provider computers providing computational power upon demand; and
further comprising paying the owners of the provider computers a fixed amount per unit work for providing excess computational power according to a formula:

$$\frac{T\ln(1-\pi)}{\ln(1-r)} \text{ per GHz-hour, where}$$

T is a rate, Tc is an average availability, and r is a target reliability.

27. The method for using excess computational power of claim 26 further comprising supplying the at least one client computer with a client application programming interface (API) for allowing the client computer to specify parameters under which the programs are to be run.

28. The method for using excess computational power of claim 27, wherein the parameters to be specified are at least computer power, disk space required, and reliability of the computer power.

29. The method for using excess computational power of claim 27, further comprising providing the at least one client computer with a run time interface, the run time interface including a set of function calls used by the client computer for getting parameters from the run time environment, for getting data elements, for querying the CTS for task status, and for performing checkpointing at various places in the program.

30. The method for using excess computational power of claim 29, further comprising providing the run time interface with instructions for creating jobs.

31. The method for using excess computational power of claim 30, further comprising providing the run time interface with instructions for creating tasks within jobs.

32. The method for using excess computational power of claim 30, further comprising providing the run time interface with instructions for querying against a status of jobs.

33. The method for using excess computational power of claim 30, further comprising providing the run time interface with instructions for attaching the client computer of a job in progress and for checking on the status of a job while the job is in progress.

34. The method for using excess computational power of claim 26, further comprising providing the CTS with instructions for charging the at least one client for excess computational power used during the execution of the programs.

35. The method for using excess computational power of claim 34 wherein the charging of the client is made when the task is launched.

36. The method for using excess computational power of claim 35 including launching a task when it is scheduled by the CTS to be run by at least one provider computer.

37. The method for using excess computational power of claim 26, further comprising providing the CTS with instructions for monitoring a virtual node specified by the client for failure.

38. The method for using excess computational power of claim 34 wherein charging of clients is based upon a sum of the computational power of the provider computers running the client tasks.

39. The method for using excess computational power of claim 34, further comprising providing the CTS with instructions for making payments to providers based upon available computational power of the provider's computer.

40. The method for using excess computational power of claim 39 wherein the available computational power is determined as a function of CPU availability, CPU speed and bandwidth availability.

41. The method for using excess computational power of claim 40 wherein CPU speed is measured by running benchmark tests of the CPU periodically.

42. The method for using excess computational power of claim 26, further comprising providing each of the plurality of provider computer with a general purpose compute engine (CE) for executing programs sent from the central server.

43. The method for using excess computational power of claim 42, further comprising providing the CE with instructions for allowing an owner of the provider computer to set availability parameters of the provider computer.

44. The method for using excess computational power of claim 43 wherein the availability parameters comprise amount of RAM available for the programs, amount of disk space available for the programs and times during the day, if any, that the provider computer is available to execute the programs.

45. The method for using excess computational power of claim 43, further comprising providing the CE with instructions for opening a widow on the provider computer when the programs are being run.

46. The method for using excess computational power of claim 43, further comprising providing the CE with instructions for displaying content from the central server in the window.

47. The method for using excess computational power of claim 43, further comprising providing the CE with instructions for executing the programs only when excess computational power is detected on the provider computer.

48. The method for using excess computational power of claim 26 wherein an amount charged to the client I is computed based on a formula:

$$\text{Price per hour for computation} = 4.5 + 0.296 P^{1.155},$$

where P is computational power of the computer in Mhz.

49. The method for using excess computational power of claim 48, further comprising charging the client for data transfer during the course of executing the particular tasks of the client based upon the following formula:

$$\text{Total Cost of Data Transfer} = g(d_i + d_o)\left(\frac{\ln(1-r)}{\ln(1-\pi)} + 1\right),$$

where di in the quantity (in GB) of data transferred from the client to the server, do is the quantity of data transferred from the server to the client, where g is the transfer cost per communication path among the client computer, the provider computer and the CTS per GB, r is a requested node reliability, and r is an average provider computer reliability.

50. The method for using excess computational power of claim 49, further comprising charging the client an hourly premium for requesting reliability greater an a set baseline reliability given by the formula:

$$\text{Price per hour for premium reliability} = kCN\left(\frac{\ln(1-r)}{\ln(1-R)} - 1\right)$$

where k is a baseline price per MHz-hour, C is the CPU speed requested of a virtual node requested by the client, N is the number of virtual nodes running, r is the requested reliability, and R is the baseline reliability. jobs.

* * * * *